Dec. 6, 1932.  H. H. GLASIER  1,889,984
LEVER SPADE
Filed Nov. 1, 1930  3 Sheets-Sheet 1
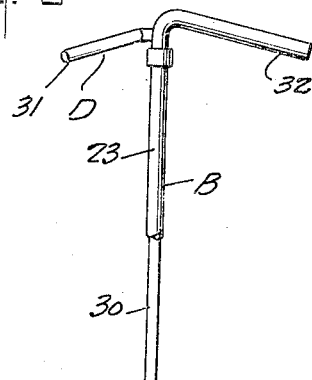
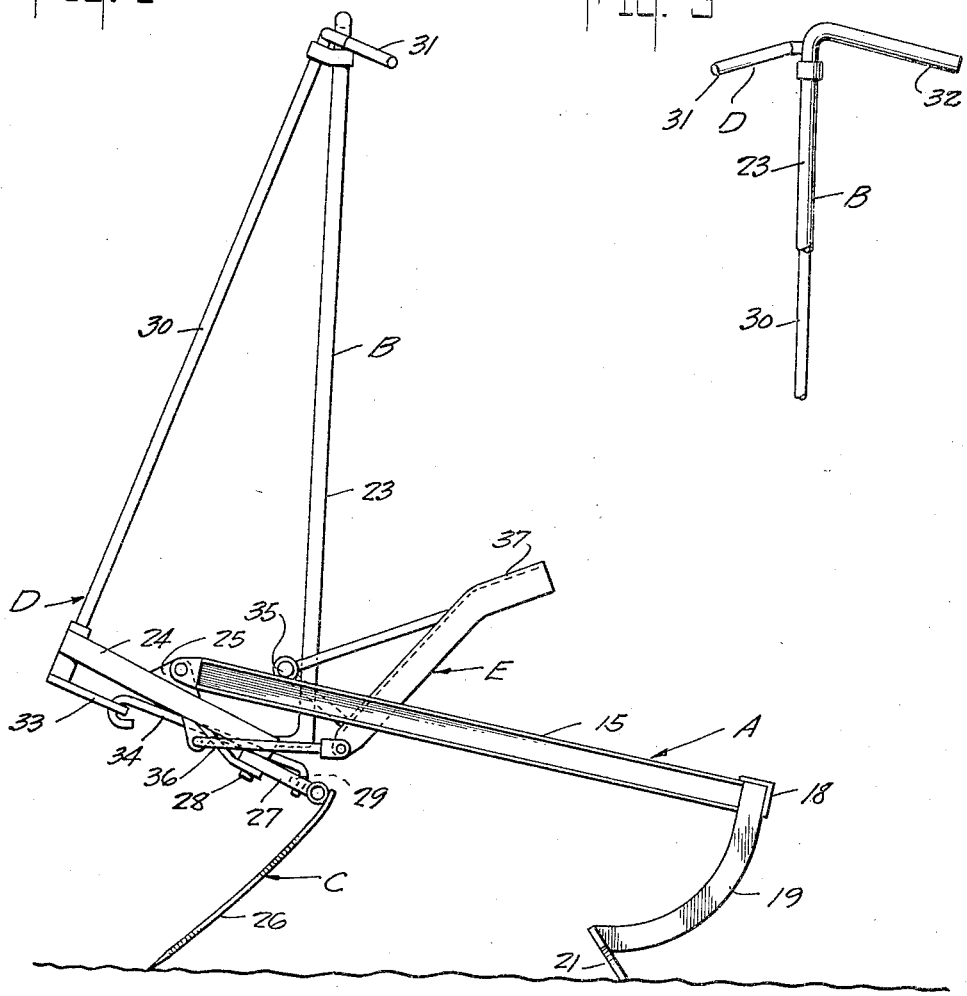
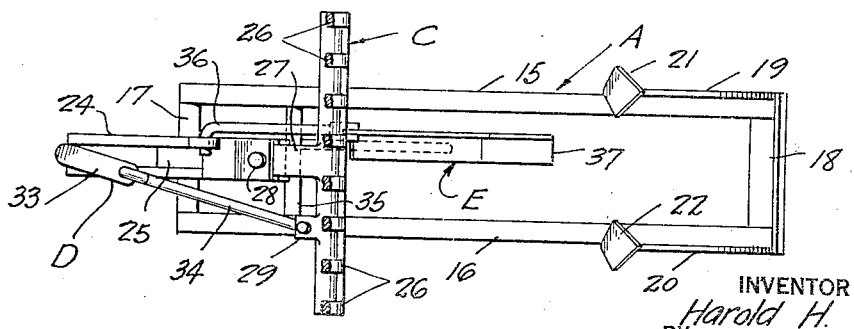
INVENTOR
Harold H. Glasier
BY Westall and Wallace
ATTORNEYS Dec. 6, 1932.  H. H. GLASIER  1,889,984
LEVER SPADE
Filed Nov. 1, 1930   3 Sheets-Sheet 2
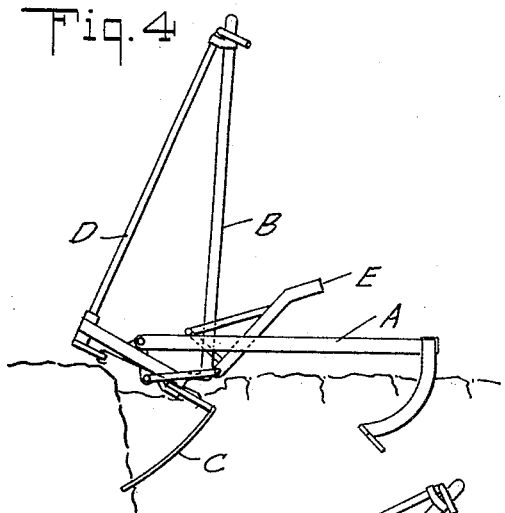
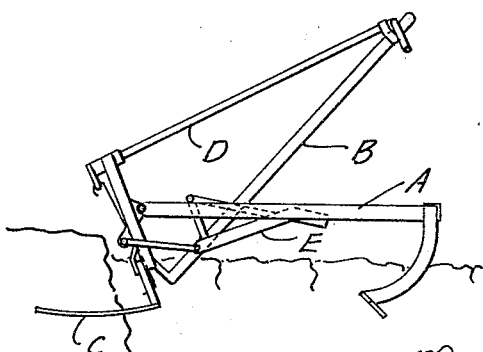
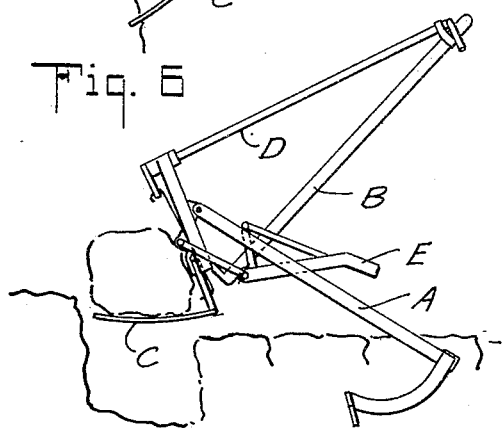
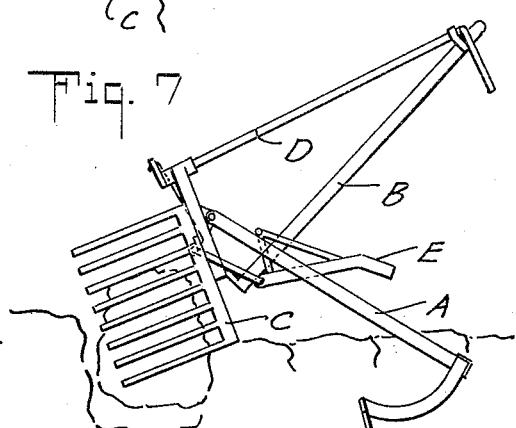
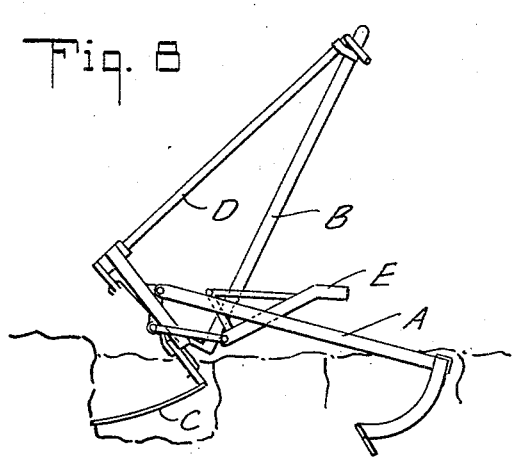
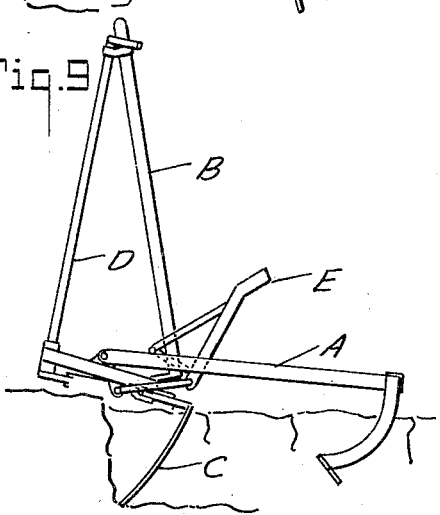
INVENTOR
Harold H. Glasier
BY Westall and Wallace
ATTORNEYS Dec. 6, 1932.    H. H. GLASIER    1,889,984
LEVER SPADE
Filed Nov. 1, 1930    3 Sheets-Sheet 3
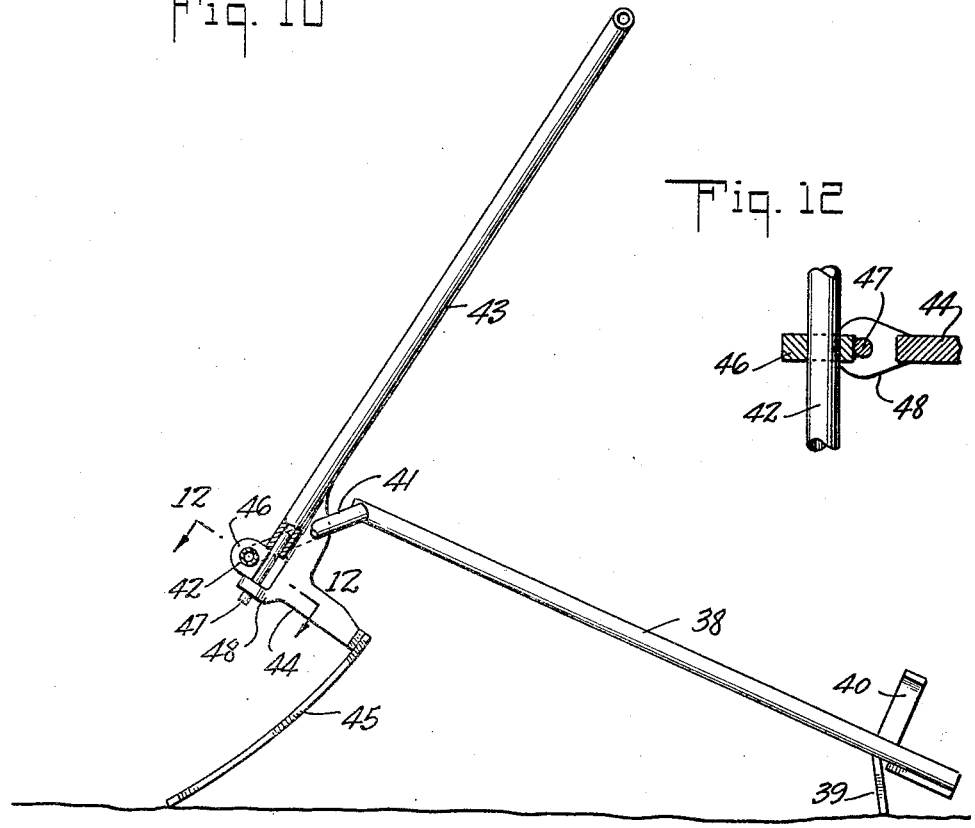
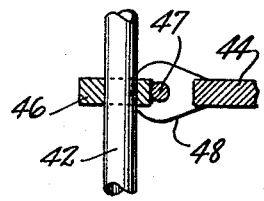
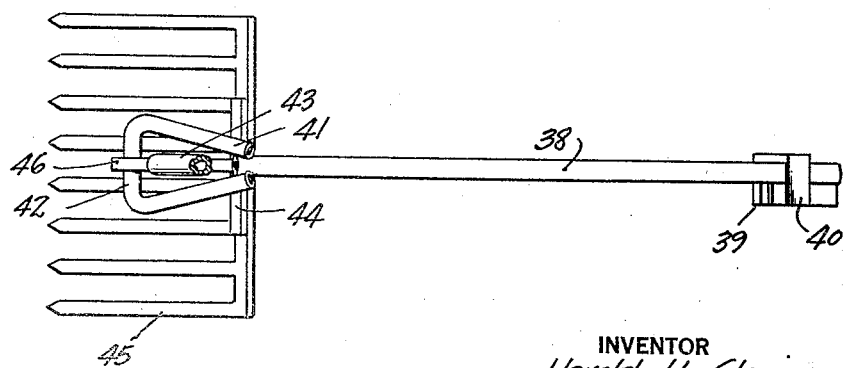
INVENTOR
Harold H. Glasier
BY
Westall and Wallace
ATTORNEYS Patented Dec. 6, 1932

1,889,984

UNITED STATES PATENT OFFICE

HAROLD H. GLASIER, OF LOS ANGELES, CALIFORNIA

LEVER SPADE

Application filed November 1, 1930. Serial No. 492,793.

This invention relates to a lever spade wherein both the piercing of the ground by the spade and the breaking out of the ground is accomplished by means of a lever system. Ordinary spades are forced into the ground by directly pushing the spade into the ground. Breaking out of the ground is accomplished by a lever motion, that is pulling or pushing backwardly or forwardly on the handle. Obviously piercing of the ground, if hard, requires considerable force. The present invention appertains to a spade mechanism wherein advantage is taken of a lever action to cause the spade to pierce the ground and the spade enters with a gradually turning motion toward the direction of the ground surface.

The objects of this invention are to provide a spade device of the character above described having any or all of the following features: a ground brace which has a heel at its rear serving as a fulcrum and ground anchor with a spader pivotally connected to the front of the brace; a spade device as described having a spader swivelled to the ground brace at the front so it may be laterally turned to dump the load; and a foot lever to assist in causing the blade to pierce the ground.

These objects together with other objects and corresponding accomplishments are obtained by means of the embodiments of my invention illustrated in the accompanying drawings, in which:

Figs. 1 to 9 show one embodiment of the invention and Figs. 10, 11 and 12 another. Fig. 1 is a side elevation; Fig. 2 is a plan looking upward with the spader forks partly broken away; Fig. 3 is a front elevation of the handles, being a fragmentary view; Figs. 4 to 9 show the spader in successive positions during operation; Fig. 10 is a side elevation; Fig. 11 a plan view; and Fig. 12 is a section as seen on the line 12—12 of Fig. 10.

Referring with more particularity to Figs. 1 to 9 inclusive, a frame comprising a brace has side bars 15 and 16 joined at front and rear by cross bars 17 and 18, the latter forming a pedal rest. The ground brace is indicated generally by A and is provided at the rear with anchoring and fulcruming heel hooks 19 and 20 which are shown with plates 21 and 22 at their ends.

A handle B has a pivoted shaft 23 and a laterally turned portion 24 with a clevis at the end. A bracket 25 serves for pivoting the handle B upon the brace A.

Pivotally secured to the handle B is the shank of a spader fork, which fork is generally marked C. The spader fork consists of a number of tines 26 secured to a shank 27 which is pivoted at 28 to the clevis of portion 24 of the handle. The arrangement is such that the spader fork may be turned with respect to the axis of the handle. A lug 29 is provided on the fork at one side of the pivotal axis 28.

Means for turning the spade upon the handle is indicated generally by D. It comprises a shaft 30 pivotally mounted at the forward end of the handle portion 24 and at the top of the handle shank 23. There is a hand grip 31 adjacent laterally turned handgrip 32 on the handle proper. A crank arm 33 is secured to the lower end of shaft 30 and a link 34 connects the end of the crank to the bracket lug 29.

The arrangement is such that with the parts in position shown in Figs. 1 and 2, the spade is maintained in a plane transverse of the brace A. The crank arm 33 and link 34 are in line and on dead center so that turning of shaft 30 must be resorted to, to turn the spade upon the handle. It is also obvious that the spade may be swung as a lever about the front of brace A.

To aid in swinging the spade, a foot lever indicated generally by E of bell crank form is pivoted to the brace A at 35 and has a connecting link 36 secured to a bracket upon the handle portion 24. A pedal 37 is provided at the rear of the foot lever E.

In operation, the device is made to run under the surface of the ground like a plow, in which case the backwardly projecting plates 21 are employed. Referring to Figs. 4 to 9 inclusive, the heel of the brace A is forced into the ground and the frame of the brace is disposed in horizontal position. The operator will have moved the handle B to a forward position. He places his foot upon the pedal rest of the brace A and draws the handle B backward, swinging it about the pivotal connection to a position shown in Fig. 5. If the operator desires, he may place his other foot upon the foot lever E and depress the latter to aid in obtaining movement. It will be noted that the tines of the spader fork have been turned to almost horizontal position. Although a spader fork has been shown, it is obvious that any suitable type of digging tool of like nature may be employed and such a tool has been referred to in the claims as a spade in this broad sense. The operator then pulls the handle toward him exerting a pressure on the back of the frame and fulcruming about the heel so as to tilt the frame and lift the load to the position shown in Fig. 6. During this time he continues to exert pressure on the pedal rest, the entire device swinging bodily about the heel. The operator brings the spade above the surface of the ground and then turns the shaft mechanism D so as to tilt the spade to the side as shown in Fig. 7 and dump the load. The spade is then returned. The lever is now dropped back upon the upturned ground and swung forward which movement draws the brace and heel forward and places them ready for the next as shown in Fig. 9. It will be noted that during the spading operation the spade pushes away from the pivot point on the brace and the heel pushes backwardly. During the advance of the spade from the position shown in Fig. 8 to that shown in Fig. 9, there is a forward pull upon the heel and also a pull upon the spade.

In Figs. 10, 11, and 12 a surface operating spade is shown, in which there is a brace 38 having a heel talon 39 adapted to enter the ground for anchoring and fulcruming purposes. At the rear end is a foot rest bridged by a strap 40 adapted to receive the toe of the operator. A yoke 41 at the front of the brace has a pivot section 42. The shank of a handle is marked 43 and has a fork back 44 supporting the tines 45. A bracket 46 has a pin 47 welded thereto, the latter serving as a journal for the handle and spade to turn thereon. Bracket 46 is pivoted on section 42. A journal extension 48 is formed on back 44 and pin 47 acts as a journal pivoting therein, and in the lower end of handle shank 43.

What I claim is:—

1. A lever spade comprising a brace adapted to range along the ground and having a heel at its rear for anchoring and fulcruming thereabout, a spader having a spade and a handle laterally offset, said spader being pivotally connected laterally forward of and above said spade to said brace at its front end whereby to be rockable forwardly and backwardly about the front of said brace and to be bodily swung with said brace about said heel.

2. A lever spade comprising a brace adapted to range along the ground and having a heel at its rear for anchoring and fulcruming thereabout, a spader having a spade and handle laterally offset, said spader being swivelled laterally forward of and above said spade to said brace at its front end whereby to be rockable about the front of said brace forwardly and backwardly and to be tiltable laterally thereof and to be bodily swung with said brace about said heel.

3. A lever spade comprising a brace adapted to range along the ground and having a heel at its rear for anchoring and fulcruming thereabout, a pedal rest at said heel for the foot of the operator, a spader having a spade and a handle laterally offset, said spader being pivotally connected laterally forward of and above said spade to said brace at its front end whereby to be rockable about the front of said brace and to be bodily swung with said brace about said heel.

4. A lever spade comprising a brace adapted to range along the ground and having a heel at its rear for anchoring and fulcruming thereabout, a pedal rest at said heel for the foot of the operator, a spader having a spade and a handle laterally offset, said spader being swivelled laterally forward of and above said spade to said brace at its front end whereby to be rockable about the front of said brace forwardly, backwardly and sidewise and to be bodily swung with said brace about said heel.

5. A lever spade comprising a brace adapted to range along the ground and having a heel at its rear for anchoring and fulcruming thereabout, a pedal foot rest at said heel for the foot of the operator, a spader having a spade and a handle laterally offset, said spader being swivelled laterally forward of and at the juncture of said spade and said handle to said brace at its front end whereby to be rockable forwardly, backwardly and sidewise about the front of said brace and to be bodily swung with said brace about said heel.

6. A lever spade comprising a brace adapted to range along the ground and having a heel at the rear for anchoring and fulcruming thereabout, a spader having a spade and a handle, said spader being pivotally connected to said brace at its front end whereby to be rockable about the front of said brace and to be bodily swung with said brace about said heel, and a foot lever pivoted on such brace and having an arm connected to said spader whereby upon depression of the other arm of said foot lever said spade will be rocked forward about said brace.

7. A lever spade comprising a brace adapted to range along the ground and having a heel at the rear for anchoring and fulcruming thereabout, a spader having a spade and a handle, said spader being pivotally connected to said brace at its front end whereby to be rockable about the front of said brace and to be bodily swung with said brace about said heel, and a bell crank foot lever pivoted on such brace and having an arm connected to said spader whereby upon depression of the other arm of said foot lever said spade will be rocked forward about said brace.

8. A lever spade comprising a brace adapted to range along the ground and having a heel at the rear for anchoring and fulcruming thereabout, a spader having a spade and a handle, said spader being swivelled to said brace at its front end whereby to be rockable forwardly, backwardly and sidewise about the front of said brace and to be bodily swung with said brace about said heel, and a foot lever pivoted on such brace and having an arm connected to said spader whereby upon depression of the other arm of said foot lever said spade will be rocked forward about said brace.

9. A lever spade comprising a brace adapted to range along the ground and having a heel at the rear for anchoring and fulcruming thereabout, a spader having a spade and a handle, said spader being swivelled to said brace at its front end whereby to be rockable forwardly, backwardly and sidewise about the front of said brace and to be bodily swung with said brace about said heel, and a bell crank foot lever pivoted on such brace and having an arm connected to said spader whereby upon depression of the other arm of said foot lever said spade will be rocked forward about said brace.

10. A lever spade comprising a brace adapted to range along the ground and having a heel at the rear for anchoring and fulcruming thereabout, a pedal rest at said heel for the foot of the operator, a spader having a spade and a handle, said spader being swivelled to said brace at its front end whereby to be rockable about the front of said brace forwardly, backwardly and sidewise and to be bodily swung with said brace about said heel, a bell crank foot lever pivoted on such brace and having an arm connected to said spader whereby upon depression of the other arm of said foot lever said spade will be rocked forward about said brace.

In witness that I claim the foregoing I have hereunto subscribed my name this 20th day of October, 1930.

HAROLD H. GLASIER.